United States Patent [19]

Payne

[11] Patent Number: 5,330,603

[45] Date of Patent: Jul. 19, 1994

[54] CONTINUOUS STRUCTURE FORMING METHOD

[76] Inventor: LeRoy Payne, 3300 Nicholas La., Molt, Mont. 59057

[21] Appl. No.: 870,927

[22] Filed: Apr. 20, 1992

Related U.S. Application Data

[63] Continuation-in-part of Ser. No. 753,344, Aug. 30, 1991, Pat. No. 5,145,282, which is a continuation-in-part of Ser. No. 521,442, May 10, 1990, Pat. No. 5,049,006, which is a continuation-in-part of Ser. No. 417,501, Oct. 5, 1989, Pat. No. 4,955,760, which is a continuation-in-part of Ser. No. 235,205, Aug. 23, 1988, Pat. No. 4,872,789.

[51] Int. Cl.$^5$ .............................. C09J 7/02; C09J 5/04
[52] U.S. Cl. ................... 156/295; 156/155; 156/305; 156/310; 156/314; 264/4
[58] Field of Search ............... 156/305, 155, 323, 324, 156/295, 314, 145, 550, 547, 313, 287, 315, 310, 330; 523/200, 205, 206, 207, 210, 211; 264/4

[56] References Cited

U.S. PATENT DOCUMENTS

| | | | |
|---|---|---|---|
| 2,530,306 | 11/1950 | Land | 264/4 |
| 3,390,037 | 6/1963 | Christie | 156/310 |
| 3,657,379 | 4/1972 | Hilbelink et al. | 156/330 |
| 4,836,879 | 6/1989 | Edwards | 156/295 |
| 4,955,760 | 9/1990 | Payne | 156/550 |
| 5,028,359 | 7/1991 | Cicuta et al. | 264/4 |

*Primary Examiner*—Jeff H. Aftergut
*Attorney, Agent, or Firm*—Arthur L. Urban

[57] ABSTRACT

A method of forming a continuous structure includes the following steps. A plurality of reactive resin forming materials are preselected. A first of the resin forming materials is applied over a major surface of a porous blanket in a first preselected pattern including a plurality of independent sections. A second of the reactive resin forming materials is applied over a major surface of the porous blanket in a second preselected pattern including a plurality of independent sections spaced from the independent sections of the first pattern. Substantially simultaneously, the reactive resin forming materials in the respective patterns are intermixed. A liquid resin mixture is formed over the porous blanket. The treated blanket is positioned in a preselected configuration while the blanket is deformable and adhesive. The blanket is set in that configuration. Also, the resulting continuous structure.

17 Claims, 1 Drawing Sheet

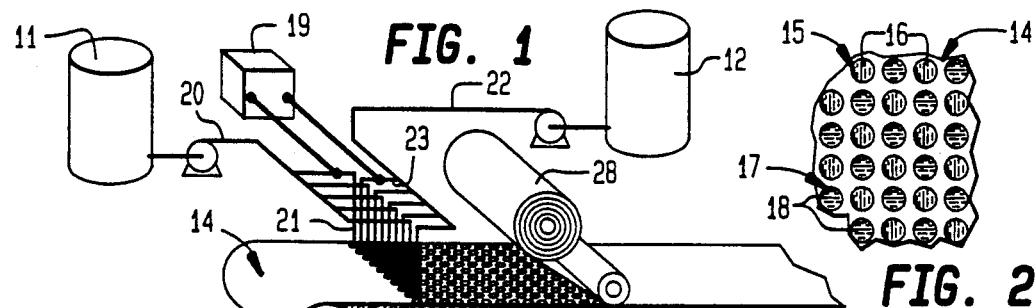
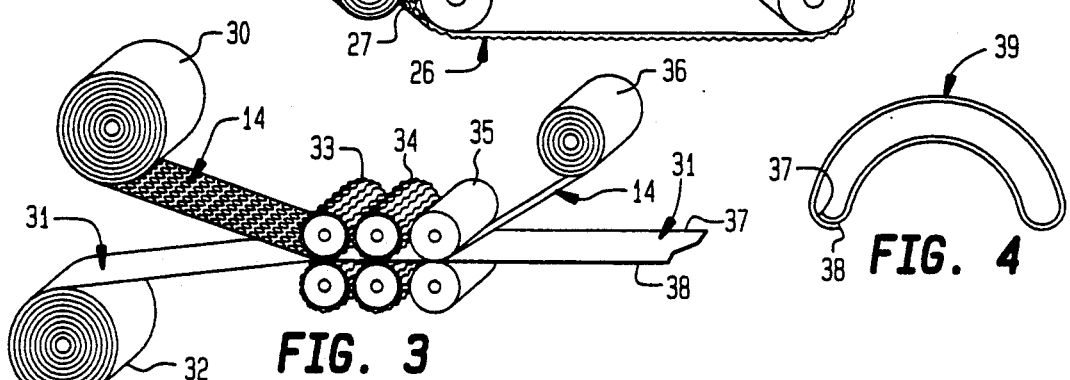
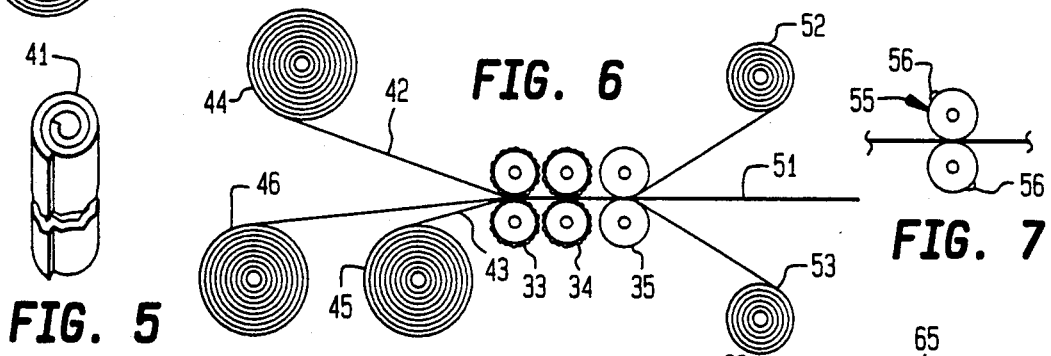
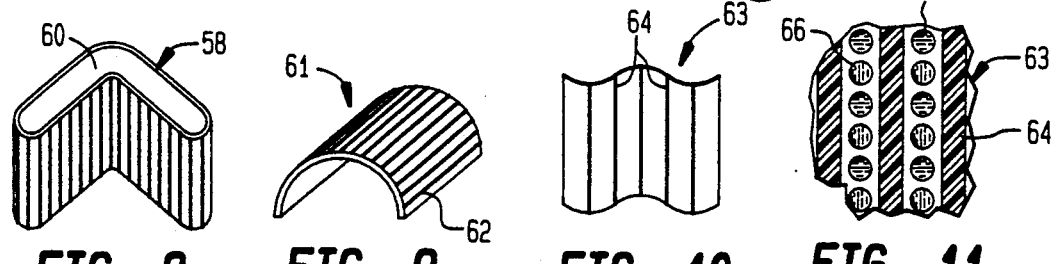
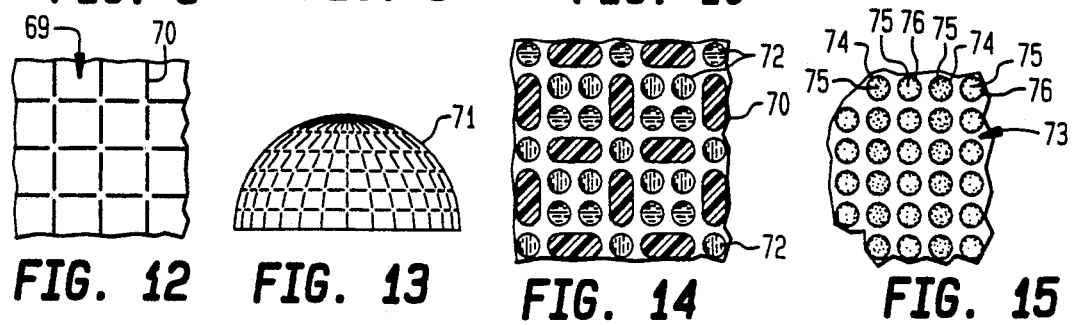

CONTINUOUS STRUCTURE FORMING METHOD

This application is a continuation-in-part of pending application Ser. No. 753,344, filed Aug. 30, 1991, now U.S. Pat. No. 5,145,282 which in turn is a continuation-in-part of application Ser. No. 521,442, filed May 10, 1990, now U.S. Pat. No. 5,049,006, which in turn is a continuation-in-part of application Ser. No. 417,501, filed Oct. 5, 1989, now U.S. Pat. No. 4,955,760, which in turn is a continuation-in-part of application Ser. No. 235,205, filed Aug. 23, 1988, now U.S. Pat. No. 4,872,784.

This invention relates to a novel continuous structure forming method and to a new continuous structure produced thereby.

The inventions of the applicant's patents listed above provide novel methods and apparatus to produce at a job site structures such as liners and pipe for the collection, storage and/or distribution of water and other liquids. The apparatus employed, which normally is transported to a job site, is complex and sophisticated requiring major capital investment.

A considerable portion of the cost of producing the structures not only represents costs incurred when the apparatus is in use, but also costs incurred while the apparatus is in transit to and from the job site, as well as idle time during and between jobs. These costs may be prohibitive for small jobs including patching of existing structures, particularly at remote locations.

The present invention provides a novel method and product which overcome the shortcomings of previous expedients. In addition, the method and structure of the invention provide features and advantages not found in earlier technology.

The structure of the present invention can be produced with a minimum of machinery at the job site. Thus, the structure and method of the invention can be employed efficiently and economically for patching and for small jobs even at remote locations.

The method of the invention may be conducted by individuals with only limited mechanical skills and experience. High quality structures can be produced by such individuals safely and efficiently without supervision. The configuration and composition of the structure can be changed easily.

The method of the invention can be modified to form a variety of different structures. Variations in physical dimensions, composition and surface appearance, etc. can be achieved. Even with such changes, uniform high quality can be maintained without difficulty.

A novel method of the present invention for forming a continuous structure includes the steps of preselecting a plurality of reactive resin forming materials. A first reactive resin forming material is applied over a major surface of a porous blanket in a first preselected pattern which includes a plurality of independent sections. A second reactive resin forming material is applied over a major surface of the porous blanket in a second preselected pattern that includes a plurality of independent sections which are spaced from the independent sections of the first pattern.

Resin forming materials in the respective patterns are intermixed substantially simultaneously to form a liquid resin mixture over the porous blanket. The treated porous blanket is positioned in a preselected configuration while the blanket is deformable and adhesive. The blanket is set in that configuration.

The resin forming materials may be applied directly to a porous blanket or alternatively the resin forming materials may be applied to one or more temporary carriers and subsequently combined with a porous blanket. A porous blanket and the patterns on the temporary carriers may be transported to a job site separately and there combined adjacent the final location of the structure being produced.

The patterns may be applied to the same major surface of the porous blanket in a displaced relationship or may be applied to opposite major surfaces of the blanket to achieve the desired spacing.

Premature intermixing of the respective resin forming materials can be prevented by encapsulating the independent sections of the patterns or otherwise sealing the resin forming materials from one another. The intermixing of the resin forming materials can be accomplished by the application of pressure and more particularly by puncturing independent sections containing same.

To facilitate the formation of specific products it may be advantageous to intermix resin forming materials in particular independent sections sequentially in a preselected sequence. If desired, the treated blanket may be positioned in a preselected configuration between the sequential intermixing steps. Also, the blanket may be positioned in succeeding preselected configurations between sequential intermixing steps.

Benefits and advantages of the novel method and structure of the present invention will be apparent from the following description of the accompanying drawings in which:

FIG. 1 illustrates the application of preselected patterns to a temporary carrier in one embodiment of the method of the invention;

FIG. 2 illustrates a greatly enlarged fragmentary view of the patterns formed in the method of FIG. 1;

FIG. 3 illustrates the combination of a porous blanket with preselected patterns on a temporary carrier and the intermixing of the patterns in the method of the invention;

FIG. 4 illustrates an end view of a structure formed in the method of FIG. 3;

FIG. 5 illustrates a view in perspective of another structure formed in the method of FIGS. 1-3;

FIG. 6 illustrates the combination of a porous blanket with preselected patterns on two temporary carriers and the intermixing of the patterns in the method of the invention;

FIG. 7 illustrates a fragmentary side view of another squeeze roller combination in the method of FIG. 3;

FIGS. 8, 9 and 10 illustrate views in perspective of different structures with blankets formed in the method of FIG. 7;

FIG. 11 illustrates a greatly enlarged fragmentary view of a blanket of the structures of FIGS. 8-10;

FIG. 12 illustrates a fragmentary view of another blanket formed in the method of the invention;

FIG. 13 illustrates a structure using the blanket shown in FIG. 12;

FIG. 14 illustrates a greatly enlarged fragmentary view of the blanket shown in FIG. 12; and FIG. 15 illustrates a greatly enlarged fragmentary view of another blanket in the method of the invention.

As shown in FIG. 1 of the drawings, one reactive resin forming material is contained in a reservoir 11 and a second reactive resin forming material is contained in a reservoir 12. For example, reservoir 11 may contain an "A stage" resin forming material and reservoir 12 a "B stage" resin forming material.

The resin forming material in reservoir 11 is applied to a continuous temporary carrier 14 in a first preselected pattern 15 including a plurality of independent sections 16 (FIG. 2). Also, the resin forming material in reservoir 12 is applied to the temporary carrier 14 in a second preselected pattern 17 including a plurality of independent sections 18. The independent sections 18 of the second pattern are spaced from the independent sections 16 of the first pattern (FIG. 2).

As shown in FIG. 1, resin forming material in reservoir 11 is pumped through a conduit 20 having multiple spaced delivery tubes 21. Similarly, resin forming material from reservoir 12 is pumped through a conduit 22 which supplies material to a plurality of delivery tubes 23. The delivery tubes 21 for one resin forming material are alternated between delivery tubes 23 for the second resin forming material in a single row extending transversely to the movement of a conveyor 24. Indexing means 19 changes the position of delivery tubes 21 and 23 from one row to another, if desired.

The materials from the respective reservoirs 11 and 12 being delivered from the tubes 21 and 23 move into contact with temporary carrier 14 advancing along conveyor 24. The respective materials are maintained in a plurality of independent sections. Independent sections may be created in the temporary carrier by forming a plurality of indented areas in the carrier.

As shown in FIG. 1, this can be accomplished by passing a carrier film 14 over a forming belt 26 which includes an indented pattern 27 into which the film is drawn to form the indentations. Thereafter, the respective materials fill alternate indentations in the temporary carrier. Each filled indentation becomes an independent section of the respective pattern.

The filled indentations are sealed such as by placing a continuous film 28 over the temporary carrier. In this way, two spaced preselected patterns are formed along continuous temporary carrier 14 as shown in FIGS. 1 and 2.

In FIG. 3, resin forming materials contained within the independent sections 16,18 of the patterns 15,17 formed on temporary carrier 14 from a supply roll 30 are placed into contact with a continuous porous blanket 31 advancing from supply roll 32. The combination is advanced between opposed pairs of rollers 33, 34 and 35. The pairs of rollers 33 and 34 advantageously include peripheral surfaces with grooves, corrugations or other roughness.

As the combination of the porous blanket and the temporary carrier with the filled indentations passes between the pairs of rollers 33 and 34, the roughened peripheral surfaces thereof break the seals of the filled independent sections 16,18 of patterns 15,17 and cause the reactive resin forming material of the first pattern 15 to intermix with the resin forming material of the second pattern 17.

The intermixing causes the two resin forming materials to react with each other and form a liquid resin mixture on porous blanket 31. As the treated porous blanket passes between the third pair of rollers 35, the resin mixture is distributed into the interstices of the porous blanket and forms a substantially uniform continuous matrix along the length of the blanket. the temporary carrier 14 is separated from the resin treated blanket and collected on roll 36. Advantageously, the resin treated blanket 31 then is positioned in a preselected configuration while the blanket is deformable and adhesive and the blanket is set in this configuration.

In FIG. 4, edges 37 and 38 of treated blanket 31 are joined to form a bladder 39 which may be inflated and set in an arcuate configuration. After curing, the semicylindrical elongated structure has structural integrity and can be used as a shelter which can be moved from one location to another. If desired, the bladder may be filled with an insulating foam (not shown) to enhance its rigidity for a permanent structure.

The treated blanket 31 also may be rolled into a tubular configuration 41 as shown in FIG. 5. Setting of the resin mixture in the blanket bonds adjacent coils to one another as well as forms a continuous resin matrix spiral throughout the roll. Such a structure after curing may be employed as a load bearing post or column. Additional strength can be achieved by filling the open central area with rocks, concrete or other reinforcing materials (not shown).

An alternative method of forming the post of FIG. 5 may involve wrapping the pattern/blanket combination of FIG. 3 before it passes through rollers 33-35. By wrapping it very tightly, the seals of the independent sections 16,18 can be broken, intermixing the resin forming materials and forming a resin matrix throughout the post. This method permits a structure of the invention to be constructed at a job site without requiring the use of mechanical equipment for intermixing.

FIG. 6 illustrates another embodiment of the method of the invention in which first and second patterns on separate temporary carriers 42 and 43 from rolls 44 and 45 are combined with a porous blanket 46. One resin forming pattern is applied to each opposite major surface of the porous blanket. With the filled independent sections of the respective patterns spaced from one another, the pattern/blanket/pattern combination is a stable intermediate structure that can be stored and/or transferred to a job site over an extended period of time before intermixing the resin forming materials and fabricating the final configuration.

Alternatively, as shown in FIG. 6, the combination is immediately pressed between opposed pairs of rollers 33, 34 and 35 to break the independent sections of both patterns. The resin forming materials of both patterns move together within the porous blanket and form the liquid resin mixture which cures to the resin matrix. The two temporary carriers then are separated from treated blanket 51 and collected on rolls 52 and 53.

Novel structures also may be formed with the method of the present invention by intermixing sequentially resin forming materials within preselected independent sections in a preselected sequence to form discontinuous resin segments in a porous blanket. This can be accomplished through the use of opposed pairs of rollers 55 as shown in FIG. 7. As a pattern/blanket combination is passed therebetween, the raised portion 56 of the periphery breaks the filled independent sections at spaced intervals along the pattern and intermixing takes place only within such preselected areas.

FIGS. 8, 9, 10 and 11 illustrate structures utilizing treated blankets formed as described above. In FIG. 8, a corner structural unit 58 is formed with structural strength along vertical lines 59. The open central area 60 can be inflated or filled with reinforcing materials. An elongated semi-cylindrical structure 61 (FIG. 9) similar to structure 39 in FIG. 4, can be fabricated with longitudinal cured lines 62.

FIG. 10 shows a corrugated structural panel 63 with cured resin lines 64 providing structural strength and rigidity in a vertical direction while permitting deflection along the length of the panel. The configuration of the structure 63 shown in FIG. 10 can be changed after the initially intermixed areas 64 are cured. Independent sections 65,66 (FIG. 11) subsequently may be intermixed by puncturing the sections with hand held spiked rollers or similar devices (not shown). Following the above procedure, "one of a kind" custom structures can be produced in the field simply and conveniently.

More complex structures of the invention can be formed using a blanket 69 including partially cured independent segments 70 as shown in FIG. 12. Such a blanket possesses spaced areas with structural integrity interspersed between spaced areas with great flexibility so that the blanket can be formed into a complex configuration such as a hemisphere 71 (FIG. 13). After the desired configuration has been created, resin forming materials in remaining independent sections 72 (FIG. 14) can be intermixed to increase the rigidity and strength of the final structure.

FIG. 15 illustrates a fragmentary view of a blanket 73 with patterns including differing concentrations of additives e.g. fillers, reinforcements, etc. Thus, independent sections 74 include a greater number of particles 75 than do sections 76.

The resin forming materials applied to the porous blanket either directly or with temporary carriers are selected to be capable of reaction with one another to form the particular resin matrix desired in the final product. Advantageously, the resin matrix is a thermosetting resin such as a polyurethane or polyester. Should a polyurethane be desired, one reservoir may contain an isocyanate and the other reservoir may contain a polyol. More commonly, the reservoirs may contain different partially formed materials which upon mixing interact to form the desired polyurethane. Examples of such partially formed materials include so-called "A stage" resins and "B stage" resins.

Other resin forming systems may utilize a resin forming monomer in one reservoir and a catalyst in a second reservoir. Additional components can be premixed with one of the resin formers, e.g. fillers, reinforcements, colors and the like. The important criteria is that materials applied in the pattern are stable and yet will react when intermixed.

Suitable porous blankets include woven, knit, nonwoven structures, etc. The blankets e.g. fabrics, mats, etc. may be formed of continuous or discontinuous fibers, yarns, slit ribbons and similar natural and synthetic fibrous materials. Reinforcing members such as ropes, cables and the like that extend longitudinally and/or transversely of the blanket centerline may be included if desired.

The temporary carriers on which the patterns are initially formed may be films, fabrics and the like which permit the pattern to be transferred easily to the porous blanket. Advantageously, the pattern carriers are non-porous membranes. Such non-porous membranes also may serve as barriers when the blanket and resin forming materials require protection from the surrounding atmosphere during the formation of the resin mixture and the resin matrix prior to curing.

For example, when treated blankets are utilized as patches or liners of surfaces that are underwater or another liquid, carriers with patterns disposed thereon may be placed against each major surface of a blanket 46 as shown in FIG. 6. The combination then is positioned against a base surface underwater without breaking the independent sections of the patterns.

When the combination is in place, sufficient pressure is applied thereto to break internal seals of the independent sections without damaging the outer membrane barrier. The resin forming materials therein intermix and produce a cured matrix. After curing of the resin matrix, the exposed membrane is peeled away leaving the cured blanket in contact with the base surface.

The above description and the accompanying drawings show that the present invention provides a novel method and structure which overcome the shortcomings of previous expedients and in addition, provide features and advantages not found in earlier technology.

The structure of the present invention can be produced with a minimum of machinery at the job site. Thus, the structure and method of the invention can be employed efficiently and economically for patching and for small jobs even at remote locations.

The method of the invention may be conducted by individuals with only limited mechanical skills and experience to produce high quality structures safely and efficiently. The method can be modified to form a variety of different structures. Variations in configuration, composition, physical dimensions and surface appearance, etc. can be achieved easily. Even with such changes, uniformity and high quality can be maintained without difficulty.

It will be apparent that various modifications can be made in the particular method and structure described in detail above and shown in the drawings within the scope of the present invention. The method steps and types of materials employed can be changed to meet specific process and structural requirements. For example, the number and disposition of porous blankets and patterns can be different. These and other changes can be made in the method and structure of the invention provided the functioning and operation thereof are not adversely affected. Therefore, the scope of the present invention is to be limited only by the following claims.

What is claimed is:

1. A method of forming a continuous structure including the steps of preselecting a plurality of reactive resin forming materials, applying a first of said resin forming materials over a supporting surface in a first preselected pattern including a plurality of independent sections, applying a second of said reactive resin forming materials different from said first reactive resin forming materials over a supporting surface in a second preselected pattern including a plurality of independent sections spaced from said independent sections of said first pattern, sealing said independent sections of said first pattern from said independent sections of said second pattern, transporting said first and second patterns and a porous blanket to a job site, intermixing said different reactive resin forming materials in said respective patterns while in contact with said blanket, forming a liquid resin mixture over said blanket, positioning said blanket in a preselected configuration while said blanket is deformable and adhesive, and setting said blanket in said configuration.

2. A method of forming a continuous structure according to claim 1 including the steps of forming said patterns on at least one temporary carrier and subsequently combining said patterns with said porous blanket prior to intermixing said resin forming materials of said respective patterns.

3. A method of forming a continuous structure according to claim 2 including the step of encapsulating independent sections of said patterns formed on said temporary carrier.

4. A method of forming a continuous structure according to claim 2 including the step of applying said patterns to non-porous membrane temporary carriers.

5. A method of forming a continuous structure according to claim 1 including the steps of intermixing sequentially in a preselected sequence different resin forming materials within preselected sections of said independent sections of said respective patterns and forming resinous segments over said porous blanket.

6. A method of forming a continuous structure according to claim 5 including the step of positioning said porous blanket in a preselected configuration between said sequential intermixing steps.

7. A method of forming a continuous structure according to claim 6 including the step of positioning said porous blanket in succeeding preselected configurations between said sequential intermixing steps.

8. A method of forming a continuous structure according to claim 1 including the step of intermixing said resin forming materials by the application of pressure.

9. A method of forming a continuous structure according to claim 8 including the step of intermixing said resin forming materials by puncturing independent sections of said respective patterns to achieve contact and reaction between adjacent different resin forming materials adjacent said blanket.

10. A method of forming a continuous structure according to claim 1 including the steps of positioning said patterns on opposite major surfaces of said porous blanket.

11. A method of forming a continuous structure according to claim 1 including the steps of positioning said patterns on the same major surface of said porous blanket.

12. A method of forming a continuous structure according to claim 1 including the step of forming a substantially continuous resin matrix throughout said porous blanket.

13. A method of forming a continuous structure according to claim 1 including the steps of separately transporting a porous blanket and said patterns disposed on at least one temporary carrier to a job site and combining said patterns with said porous blanket adjacent the final location of the structure being produced prior to intermixing said resin forming materials of said respective patterns.

14. A method of forming a continuous structure according to claim 1 including the step of combining a reinforcement with said porous blanket.

15. A method of forming a continuous structure according to claim 1 including the steps of applying partially formed resin materials in said first and second patterns.

16. A method of forming a continuous structure according to claim 1 wherein the intermixing of said different reactive resin forming materials in said respective patterns is achieved while said patterns and said blanket are in intimate contact by wrapping said blanket into a tight roll.

17. A method of forming a continuous structure according to claim 1 including the step of bringing said different reactive resin forming materials in said respective patterns into contact with said blanket at said job site.

* * * * *